United States Patent

Feuersanger et al.

[15] 3,699,409

[45] Oct. 17, 1972

[54] SOLID STATE DEVICE HAVING DIELECTRIC AND SEMICONDUCTOR FILMS SANDWICHED BETWEEN ELECTRODES

[72] Inventors: Alfred E. Feuersanger, Franklin Square; Moe S. Wassermann, Glen Head, both of N.Y.

[73] Assignee: GTE Laboratories Incorporated

[22] Filed: Sept. 30, 1971

[21] Appl. No.: 185,290

[52] U.S. Cl. ....................317/238, 317/230, 317/258
[51] Int. Cl. ..............................................H01l 3/00
[58] Field of Search...............317/238, 230, 231, 233

[56] References Cited

UNITED STATES PATENTS

| | | | |
|---|---|---|---|
| 3,148,091 | 9/1864 | Bahe | 148/1.5 |
| 3,502,949 | 3/1970 | Seki | 317/230 |
| 3,548,266 | 12/1970 | Frantz | 317/230 |
| 3,579,063 | 5/1971 | Wasa | 317/261 |
| 3,619,387 | 11/1971 | Mindt et al. | 317/230 |

Primary Examiner—James D. Kallam
Attorney—Irving M. Krigesman

[57] ABSTRACT

A thin film capacitor utilizes a metal base electrode formed on a substrate with an aluminum oxide film formed on the base electrode. A film of semiconducting material, preferably nickel oxide is formed on the aluminum oxide film and a metal layer formed on the semiconducting layer provides a top electrode for the capacitor. The capacitor may be formed as part of the monolithic integrated circuit or used as part of a hybrid integrated circuit.

5 Claims, 6 Drawing Figures

SOLID STATE DEVICE HAVING DIELECTRIC AND SEMICONDUCTOR FILMS SANDWICHED BETWEEN ELECTRODES

BACKGROUND OF THE INVENTION

This invention relates to capacitors and in particular to thin film capacitors for monolithic and hybrid integrated circuit networks.

Capacitors which have relatively large values of capacitance, small volume and low losses are required in the fabrication of miniature and subminiature electrical circuits. Such capacitors may be produced by applying a thin film of material having a high dielectric constant on a metal or semiconductor substrate and then depositing a metal electrode over the dielectric film. The dielectric constant and the thickness of the film determine the capacitance-to-volume ratio; the ratio increasing as the dielectric constant is increased and as the thickness of the dielectric film is decreased.

One dielectric material generally used in the manufacture of thin film capacitors is silicon dioxide. Capacitors made with this dielectric material typically have a specific capacitance, i.e. capacitance per unit area, of 0.30 – 0.50pF/mil$^2$. Tantalum oxide another dielectric material used in the manufacture of thin film capacitors has a specific capacitance of about 2.5 pF/mil$^2$.

Thin film capacitors have also been formed with a film of aluminum oxide ($Al_2O_3$) sandwiched between a metal base and top electrode. These capacitors exhibit a relatively low specific capacitance, typically in the range of 0.3 – 0.5 pF/mil$^2$ and a breakdown voltage typically in the range of 20 – 50 volts. Heretofore, increasing the specific capacitance of the capacitor by decreasing the thickness of the dielectric layer has resulted in a decrease in the breakdown voltage of the capacitor.

SUMMARY OF THE INVENTION

The invention is directed to a thin film capacitor with an aluminum oxide dielectric having relatively high specific capacitance and breakdown voltage.

The capacitor comprises a substrate onto which a first electrode is formed. A film of aluminum oxide is formed on the first electrode and a film of semiconducting material having a resistivity of less than 10$^5$ ohm-cm is formed on the aluminum oxide film. A second electrode is formed on the semiconducting film to complete the capacitor.

In the preferred embodiment of the invention the capacitor is formed as part of a monolithic integrated circuit with the substrate comprising a wafer into which resistors, transistors and diodes have been fabricated, the semiconducting film is nickel oxide and the first and second electrodes are formed of aluminum.

DESCRIPTION OF THE PREFERRED EMBODIMENT

Figure 1:
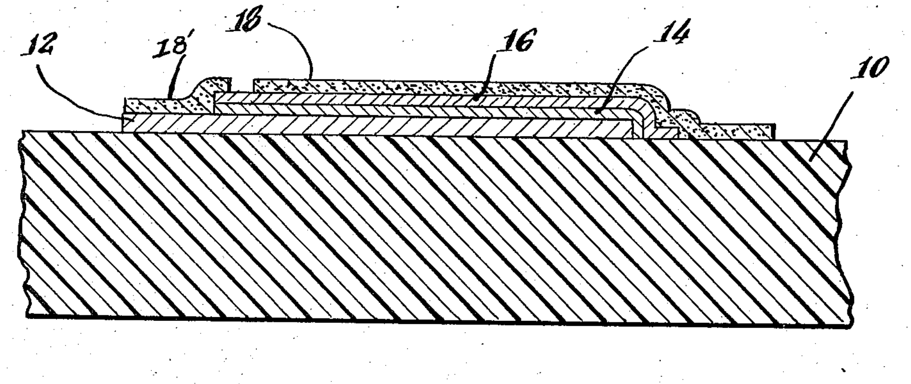
FIG. 1 is a side view in section of one embodiment of the invention.

Referring now to FIG. 1, there is shown a thin film capacitor including a substrate 10, and a base electrode 12, formed on substrate 10. A thin film of aluminum oxide 14 is formed on the base electrode and a thin film of semiconducting material 16 having a resistivity of less than 10$^5$ ohm-cm is formed on aluminum oxide layer 14. A top electrode 18 is formed on semiconducting layer 16. Layer 18' is an extension of base electrode 12.

The capacitor may be formed as part of a monolithic integrated circuit, in which case substrate 10 is a silicon wafer into which transistors, resistors and diodes have been fabricated using conventional circuit fabrication techniques. The transistors are gain-adjusted to half their final value since the gain of the transistors increases by a factor of 2 during the subsequent forming of the film of semiconducting material. A more detailed description of the fabrication of a monolithic integrated circuit can be found in the following publication: "Integrated Circuits: Design Principles and Fabrication" prepared by the Engineering Staff of Motorola Inc. Semiconductor Products Division, Raymond L. Warner, Jr., Editor, published by McGraw Hill Book Company, 1965.

Alternatively, substrate 10 may comprise an insulating material, such as glass. Base electrode 12 is preferably formed of aluminum, however, any metals on which an aluminum oxide layer can be deposited can also be used. Top electrode 18 may be formed from a variety of metals, such as gold, copper, indium, titanium, tin, magnesium or aluminum, with aluminum being the preferred metal. The aluminum oxide film 14 has a thickness in the range of about 40 – 100 A. Semiconducting film 16 has a thickness greater than 200 A with a resistivity of less than 10$^5$ ohm centimeters.

It is preferred that semiconducting film 14 be formed of semiconducting nickel oxide. This material is also referred to as defect-nickel oxide due to the fact that the vacancies are caused by reducing the number of nickel atoms in the material below that required to form the stoichiometric nickel oxide compound. The intrinsic resistivity of stoichiometric nickel oxide is relatively high, on the order of 10$^{13}$ ohm centimeters at 300°K. To enable a nickel oxide layer to be utilized as a semiconductor layer, the resistivity of the material must be substantially less than the resistivity of the stoichiometric nickel oxide.

A typical capacitor formed with an aluminum oxide thickness of 60 A and a semiconducting nickel oxide thickness of 700 A exhibits a capacitance at 1 KHz of 10 pF/mil$^2$, a dissipation factor of 0.02 and a breakdown voltage of 5 volts.

Figure 2:
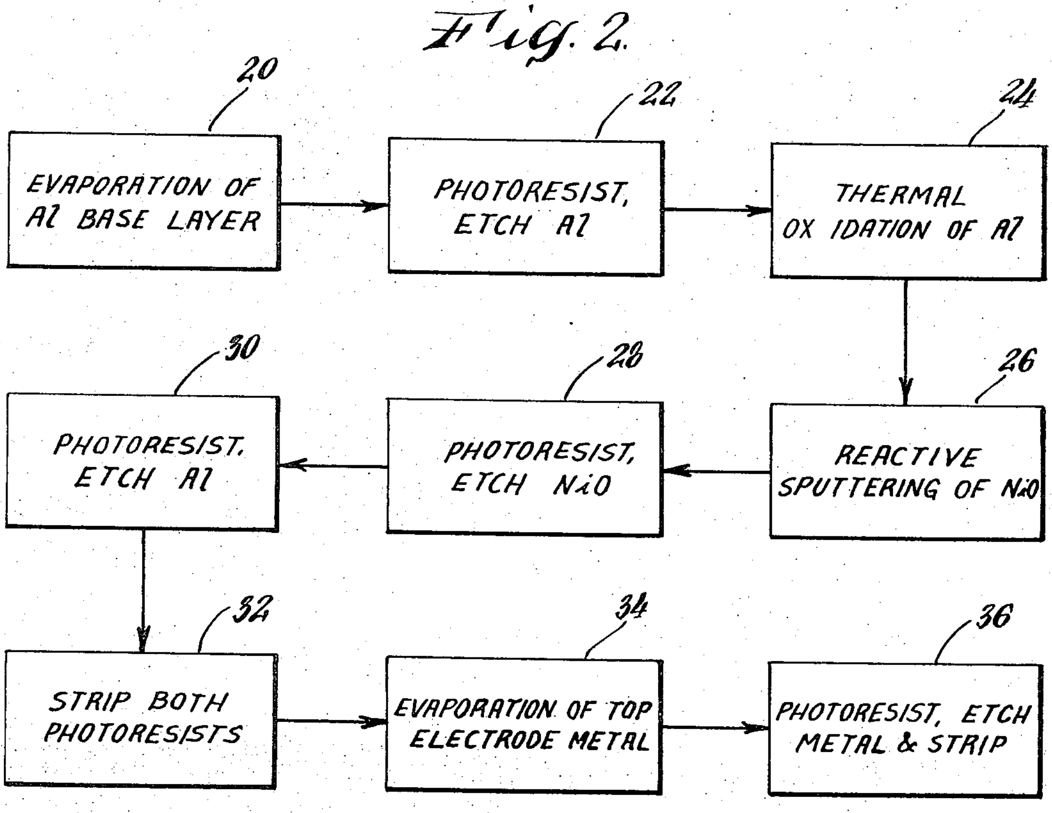
FIG. 2 is a flow chart showing the steps involved in the fabrication of a capacitor of this invention.

FIG. 2 is a flow diagram showing the steps involved in fabricating one embodiment of the thin film capacitor of this invention. In step 20, the substrate, comprising of resistors, transistors and diodes, formed into a monolithic integrated circuit is first etched for 10 seconds on a buffered hydrofluoric acid etch containing 40 percent $NH_4F$ solution and 48 percent HF in a 9 : 1 volume ratio to remove traces of $SiO_2$ from the contact windows. After etching, a base layer of aluminum, typically 0.4 – 1 micron thick, is evaporated over the surface of the wafer. This aluminum layer shorts out the transistor and diode contacts in the monolithic integrated circuit thereby preventing damage to the transistors during the subsequent process, particularly in the forming of the film of semiconducting material.

In step 22, photoresist is applied to the base layer, using conventional techniques and the base layer is etched to delineate the capacitor base electrode 12 and the interconnections to the remainder of the circuit.

Figures 3, 4:
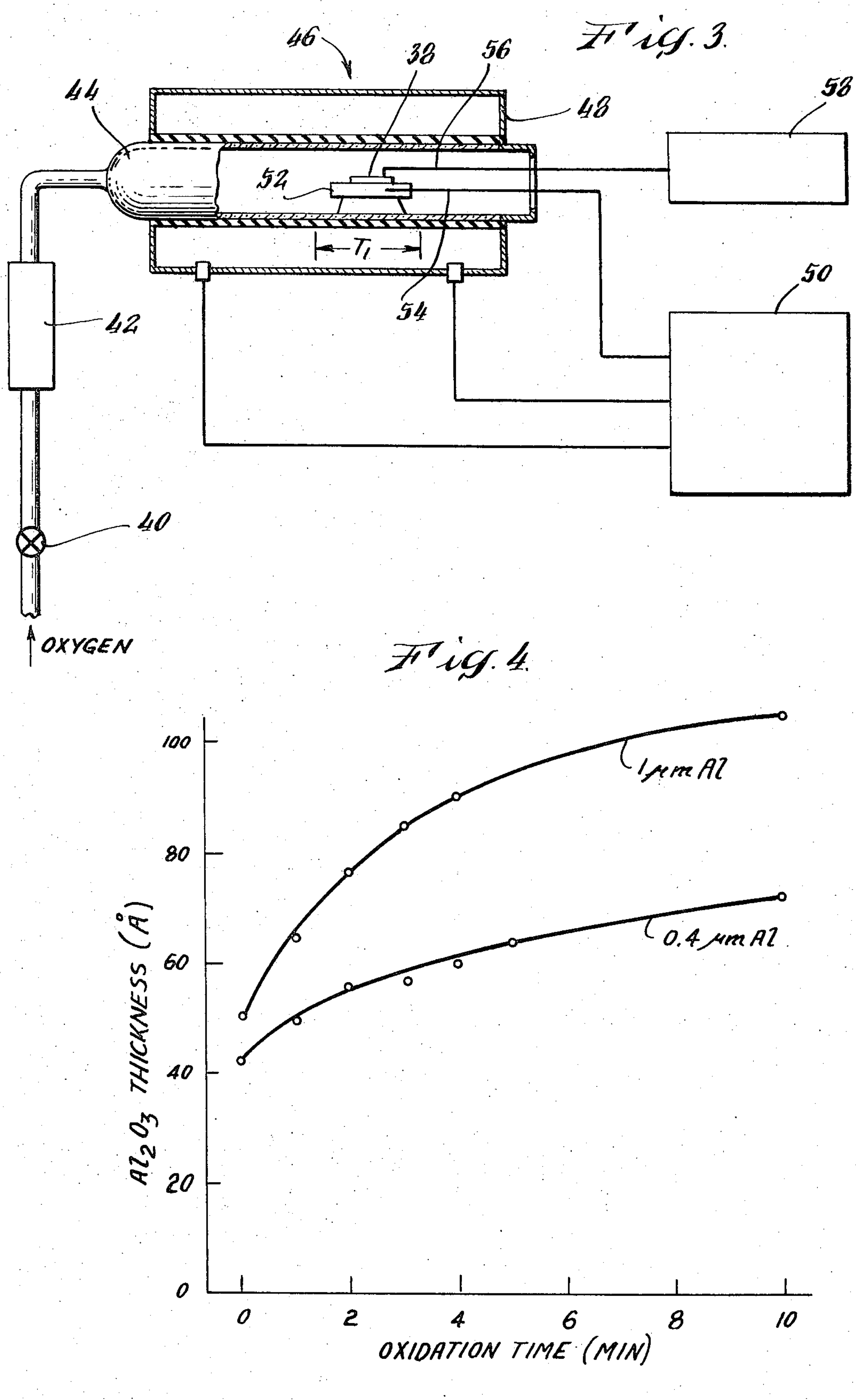
FIG. 3 is a schematic representation of an apparatus for growing the aluminum oxide layer.
FIG. 4 is a graph showing the variation in the aluminum oxide layer thickness with oxidation time.

The aluminum base layer is next (step 24) thermally oxidized using the apparatus shown schematically in FIG. 3, wherein the substrate and aluminum base layer are designated Sample 38. In this apparatus, oxygen which is either dry or saturated with water, is introduced through valve 40, flows through flowmeter 42 and into quartz tube 44 of furnace 46. Quartz tube 44 is surrounded by heating element 48, which is adjusted by temperature controller 50 to provide a uniform temperature zone, $T_1$, within the furnace. The temperature within this zone should not vary more than 1 percent in order to insure uniform thickness of the aluminum oxide film. Quartz sample holder 52, on which sample 38 is mounted, is positioned within this uniform temperature zone. Thermocouple 54 monitors the temperature of sample holder 52 and provides an input to temperature controller 50. Thermocouple 56 may be included to provide a measurement of the actual sample temperature which can be read on thermocouple potentiometer 58.

To thermally oxidize the aluminum base layer of sample 38, the furnace temperature in the $T_1$ zone is adjusted to 500°C. Dry oxygen is then, introduced into quartz tube 44 and a flow rate of 1.5 liter per minute is established. After the furnace temperature and oxygen flow have been stabilized, the sample is positioned in the constant temperature zone of the furnace and maintained there until an aluminum oxide film of desired thickness is formed. FIG. 4 is a graph showing the variation in aluminum oxide thickness with oxidation time for aluminum films of different thickness. FIG. 4 indicates that a layer of aluminum oxide was initially formed on the aluminum prior to thermal oxidation. This is caused by the oxidation of the aluminum on exposure to air. When the desired thickness of the aluminum oxide film has been formed, the sample is cooled down by moving the sample holder and sample to a region of the furnace having a temperature of about 100°C. Care must be exercised to insure that no further oxidation occurs during cool down. The sample is left in this position for about 10 minutes and then is removed from the furnace.

Figure 5:
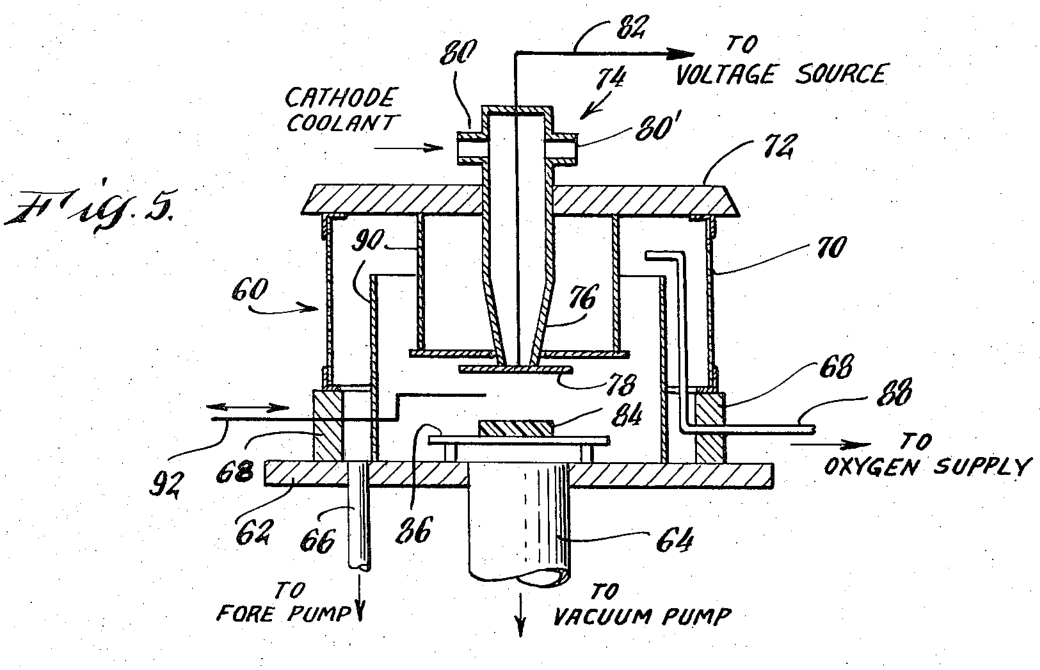
FIG. 5 is a schematic representation of the reactive sputtering apparatus suitable for use in the present invention.

After the aluminum oxide film has been formed, the sample is moved to the apparatus shown in FIG. 5 where a semiconducting nickel oxide film is formed on the aluminum oxide film by reactive sputtering (step 26).

The apparatus of FIG. 5 includes a sputtering chamber 60 having base plate 62 and vacuum pump and forepump exhaust outlets 64 and 66 respectively. The base plate 62 is provided with an upwardly extending peripheral flange 68 which is fashioned in a vacuum-tight manner to side wall 70. A top wall 72 having an opening therein for receiving the cathode assembly 74 is fashioned in a vacuum-tight manner to the side wall. The cathode assembly includes a hollow cathode support 76 having the metal cathode 78 mounted at the end thereof. The cathode support is provided with ports 80, 80' for the passage of a coolant therethrough and contains electrical lead 82 which is coupled to a suitable voltage source (not shown).

Sample 84, comprising the substrate, base electrode and aluminum oxide film, is supported on cooled platform 86 and positioned directly below the cathode 78. Platform 86 is coupled to ground to complete the electrical circuit for the sputtering current. In addition, the oxygen required for the formation of the nickel oxide film on sample 84 is provided through input port 88 in flange 68. The shield elements 90 are provided within chamber 60 to shield the walls of the chamber from the sputtered cathode material. Also, shutter 92 having an external control arm is provided to interrupt the flow of sputtering material at any desired time.

In operation, the system is pumped down to about $10^{-7}$ torr. When the desired pressure is reached, oxygen is supplied to the chamber so that the pressure is within the range of 10–80 millitorr. Then, the cathode sputtering voltage is supplied via lead 82 to the system. This voltage may be an r.f. sputtering voltage having frequencies of the order of several megahertz or may be a d.c. voltage. The voltage is typically within the range of 0.7 – 3.5 kilovolts. When the chamber is supplied with oxygen, it is desirable to maintain the pressure substantially constant with a variation of about ± 1 percent. This pressure stability increases the uniformity of the sputtered film since the properties of this film are found to be dependent upon the deposition rate which is controlled in part by the gas pressure.

The resistivity of the films formed by this method is a function of the sputtering rate. The sputtering rate in a particular sputtering chamber is determined by a number of factors, the principal factors being the cathode voltage, the space between the cathode and substrate, the area of the cathode, the temperature at which the cathode is heated during sputtering and the pressure of the oxygen in the system. To obtain the nickel oxide semiconducting film, the sputtering rate is required to be within the range of 10–100 Angstroms per minute for oxygen pressures within the range of 10–80 millitorr.

In operation, the application of a voltage to the cathode results in the heating of the cathode and a partial oxidation of the cathode material. The cathode material is sputtered and reacts with the oxygen in the environment. The low sputtering rate occurs when the cathode current density is relatively low and the cathode is heated to a relatively low temperature of 200°–300°C. As a result, the surface of the substrate is partially oxidized and a nickel- nickel oxide mixture is sputtered. By insuring that the oxygen pressure is at least 10 millitorr, the nickel in the sputtered mixture becomes oxidized as it travels to the sample. At sputtering rates of less than 100 Angstroms per minute, sufficient oxygen atoms are trapped in the film as it is formed and generate the nickel oxide semiconducting film. At deposition rates in excess of 100 A per minute, the film thickness increases rapidly and a nickel oxide insulating film is formed. More information concerning the semiconducting nickel oxide film and the formation thereof can be obtained from a prior copending application titled "Thin Film Transistor of Defect - Nickel Oxide and Method of Fabrication", inventor Alfred E. Feuersanger, Ser. No. 014739 filed Feb. 24, 1970 which is assigned to the same assignee as the present application.

When the desired nickel oxide film thickness is obtained, the sputtering voltage is removed and the sample is removed from the sputtering chamber. A photoresist is then applied to the entire wafer and the nickel oxide film is etched (step 28) in a solution of a 80 percent sulphuric acid at 25°C for 1½ minutes to remove the nickel oxide layer everywhere except over the capacitor. In step 30, photoresist is applied and the portions of aluminum base layer protecting the transistors and diodes are etched away. This step is carried out in $H_3PO_4$ at 75°C for 5 minutes. After this, the photoresists applied in steps 28 and 30 are stripped away (step 32).

A metal layer is then evaporated (step 34) over the nickel oxide film. This layer is typically 0.4 micron thick and may be formed of aluminum, copper, gold, indium, titanium and magnesium; however, aluminum is preferred since it is compatible with integrated circuit processing. A photoresist is applied to the metal layer (step 36) which is then etched in $H_3PO_4$ at 70°C for 1½ minutes to delineate the top electrode and its interconnections. Finally, the photoresist is removed.

Figure 6:
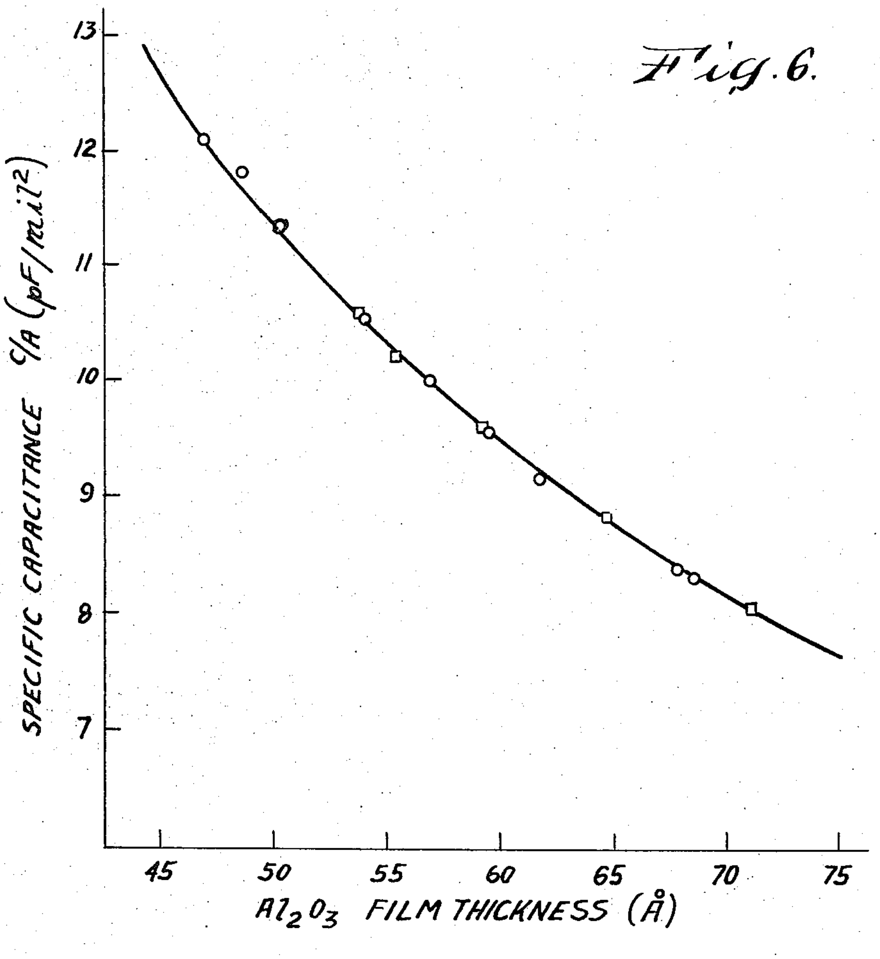
FIG. 6 is a graph showing the variation in specific capacitance with the aluminum oxide thickness.

The specific capacitance of the capacitor is a function of the thickness of the aluminum oxide layer. FIG. 6 is a graph showing the variation in specific capacitance with aluminum oxide layer thickness for a capacitor formed in accordance with this invention. The breakdown voltage of these capacitors is typically in the range of 5 – 10 volts.

What is claimed is:

1. A solid state device comprising:

a. a substrate;

b. a first electrode formed on said substrate;

c. a film of aluminum oxide formed on said first electrode;

d. a film of semiconducting material having a resistivity of less than $10^5$ ohm-cm formed on said aluminum oxide film; and e a second electrode formed on said film of semiconducting material.

2. The device of claim 1 wherein said film of semiconducting material is defect nickel oxide.

3. The device of claim 2 wherein said film of aluminum oxide is between 40 and 100 Angstroms thick.

4. The device of claim 3 wherein said film of defect nickel oxide is greater than 200 Angstroms thick.

5. The device of claim 4 wherein said first and second electrodes are formed of aluminum.

* * * * *